United States Patent
Chaleat et al.

(10) Patent No.: US 6,676,890 B2
(45) Date of Patent: Jan. 13, 2004

(54) DEVICE FOR PRODUCING SPHERICAL BALLS

(75) Inventors: Bernard Chaleat, Saint-Julien-en-Genevois (FR); Louis Bechet, Sciez (FR)

(73) Assignee: Industrie des Poudres Spheriques, Annemasse (FR)

( * ) Notice: Subject to any disclaimer, the term of this patent is extended or adjusted under 35 U.S.C. 154(b) by 16 days.

(21) Appl. No.: 10/194,011

(22) Filed: Jul. 15, 2002

(65) Prior Publication Data

US 2003/0020213 A1 Jan. 30, 2003

(30) Foreign Application Priority Data

Jul. 26, 2001 (FR) ............................................ 01 10007
Aug. 10, 2001 (FR) ............................................ 01 10702

(51) Int. Cl.$^7$ ................................................. B22F 9/08
(52) U.S. Cl. ................... 266/236; 222/593; 228/41; 228/260; 228/262; 425/6; 266/91; 75/335
(58) Field of Search ................ 266/236, 91; 228/41, 228/260, 262; 222/593; 425/6; 75/335

(56) References Cited

U.S. PATENT DOCUMENTS

| 171,502 A | 12/1875 | Catchpole et al. |
|---|---|---|
| 3,899,416 A | 8/1975 | Schwartz et al. |
| 4,428,894 A | 1/1984 | Bienvenu |
| 4,818,279 A | 4/1989 | Chaleat et al. |
| 5,229,016 A * | 7/1993 | Hayes et al. ................. 222/590 |
| 6,491,737 B2 * | 12/2002 | Orme-Marmerelis et al. . 75/335 |

FOREIGN PATENT DOCUMENTS

| GB | 2 168 725 A | 6/1986 |
|---|---|---|
| JP | 11 128845 | 5/1999 |
| JP | 2000 328112 | 11/2000 |

* cited by examiner

*Primary Examiner*—Melvyn Andrews
(74) *Attorney, Agent, or Firm*—Oliff & Berridge, PLC

(57) ABSTRACT

Spherical balls, notably microballs of welding alloys, are produced by passing a melted material through vibrating orifices of a granulation pot, in order to form droplets which solidify when falling, by gravity, into a cooling tower filled with an inert gas. To improve the surface condition of the balls, the inert gas comprises approximately 15 to 150 ppm of oxygen. Moreover, the melted material is subject to ultrasound stirring just before being fed into the granulation pot. The balls are, preferably, dampened at the outlet of the cooling tower by brushes composed of polyamide wires. Besides, the control of the vibration frequency of the vibrating orifices in relation to the percentage of balls meeting the standards enables to improve the output.

19 Claims, 9 Drawing Sheets

DEVICE FOR PRODUCING SPHERICAL BALLS

TECHNICAL FIELD OF THE INVENTION

The invention concerns a device for producing spherical balls comprising:
- means for feeding, in a fusion vessel, material intended for the manufacture of balls,
- a second vessel communicating with the fusion vessel in order to receive the melted material,
- means to form, from the melted material contained in the second vessel, a jet through at least one orifice,
- vibrating means used to transmit vibrations to the orifice, in order to transform the jet into droplets,
- a cooling tower, arranged at the outlet of the orifice and filled with an inert gas, wherein the droplets, falling by gravity, solidify to form the balls, and means for receiving balls at a lower end of the cooling tower

STATE OF THE ART

There exist numerous methods and granulation devices, applied in numerous industrial domains, for example in metallurgy, fertilisers, food or pharmaceutical industry, etc . . . They all aim at transforming into balls materials which, melted, have, in open air or under neutral gas, low viscosity, good surface tension, good flowability through orifices and are liable to solidify by cooling.

For exemplification purposes, the document WO-A-8101811, corresponding to the patent U.S. Pat. No. 4,428,894, describes a method and a device for producing metallic granulates, 0.1 to 5 mm in diameter, from a melted metal bath. According to this known method, a jet of melted metal is formed, it is passed through a vibrating orifice in order to divide the jet into individual drops, the drops are caused to fall from the jet by gravity through an atmosphere of inert gas, in order to cause the drops to solidify by cooling into granulates.

However, in practice, there are few methods and calibrated granulation devices, i.e. capable of large-scale producing, with good output, balls of uniform sizes with very good surface condition. Besides, whatever the material (organic product, metal . . . ) granulated by this type of technique, it often happens that a certain percentage of the production is composed of balls vastly deformed or of balls stuck together, often in pairs, such a pair being designated as a dumbbell.

Still, it is necessary, for certain applications, to produce balls, more specifically microballs, without any surface defects and with very accurate granulometry. These microballs must, preferably, not only have uniform diameter, but also be perfectly spherical and isolated. In the mechanical industry, when balls are composed of a material with relatively high hardness, one uses generally selection devices or sorting devices, comprising hoppers, rolls, etc . . . It is the case notably of balls for bearings, for pens, etc . . . The balls may then sustain shocks and frictions without marking their surface. Conversely, in certain cases, the sphericity and the surface condition of the balls should not be altered by the selection device.

It is the case, notably, for the welding alloyed balls intended to be used in electronics to form connections, for example for casing of BGA (<<Ball Grid Array>>) type. Still, the metals used in the welding alloys are soft metals and the surface condition of a ball composed of such metals can be altered very easily.

OBJECT OF THE INVENTION

The purpose of the invention is to obtain balls without any surface defects. More particularly, the balls must be perfectly spherical, with excellent surface condition, without any oxidisation. The composition of the balls must be very stable with each batch of manufacture and the tolerances very narrow as regards granulometry.

According to the invention, this target is met in that the device comprises an outlet chamber in the fusion vessel and means for ultrasound stirring of the melted material contained in the outlet chamber before its transfer into the second vessel, whereas the inert gas in the cooling tower contains a pre-set quantity of oxygen.

According to a development of the invention, the means for receiving balls comprise shock-absorbing means. Said means comprises, preferably, brushes composed of polyamide-based wired, forming an angle of approx. 45° with the trajectory of the balls in the cooling tower. Cloth rollers can, moreover, be arranged on the inner periphery of the inner wall of the cooling tower, above the brushes.

According to a preferred embodiment, the device comprises, at the outlet of the cooling tower, means for periodic withdrawal of the balls and calibration means comprising means for sorting the balls into three categories, in relation to their sizes. It may also comprise means for weighing the set of balls of each category obtained at each withdrawal sequence, means for determining, on the basis of information supplied by the weighing means, a percentage of balls within pre-set standards and means for adjusting the frequency of the vibrating means in relation to said percentage.

It is another object of the invention to provide a device for producing spherical balls with a selection device of spherical balls enabling to sort balls of uniform diameter, in order to put aside all the balls which are not perfectly spherical.

According to the invention, this target is met by the fact that the selection device comprises means for supplying the balls on a first tilted plane of a succession of tilted planes, separated by spaces of pre-set dimensions, whereby at least the first tilted plane, in the direction of displacement of the balls, has a surface whereof the roughness is greater than that of the following tilted planes.

According to a preferred embodiment, the means for supplying the balls on the first tilted plane comprise a rolling plane, stop means, ejection means to eject from the rolling plane, jerkily, the balls resting against the stop means.

The ejection means comprise, preferably, a hollow ramp, animated by a lateral back and forth movement and fitted with a plurality of air ejectors distributed evenly along the ramp.

According to another characteristic of the invention, the means for supplying the balls on the first tilted plane comprise a conveyor belt having a tilted face in the same direction as the tilted planes and a rotational direction opposite the rolling direction of the balls on said face.

Another object of the invention concern the elimination of the balls stuck together.

According to a development of the invention, this other object is met by the fact that the selection device comprises, downstream of the tilted planes, a toothed wheel animated by a rotational movement round a tilted axis and comprising longitudinal grooves whereof the sizes enable an isolated ball to roll and prevent a pair of stuck balls from rolling.

BRIEF DESCRIPTION OF THE DRAWINGS

Other advantages and characteristics will appear more clearly from the following description of particular embodiments of the invention given for exemplification purposes, without limitation thereto and represented on the appended drawings, wherein.

DESCRIPTION OF PARTICULAR EMBODIMENTS

Figure 1:
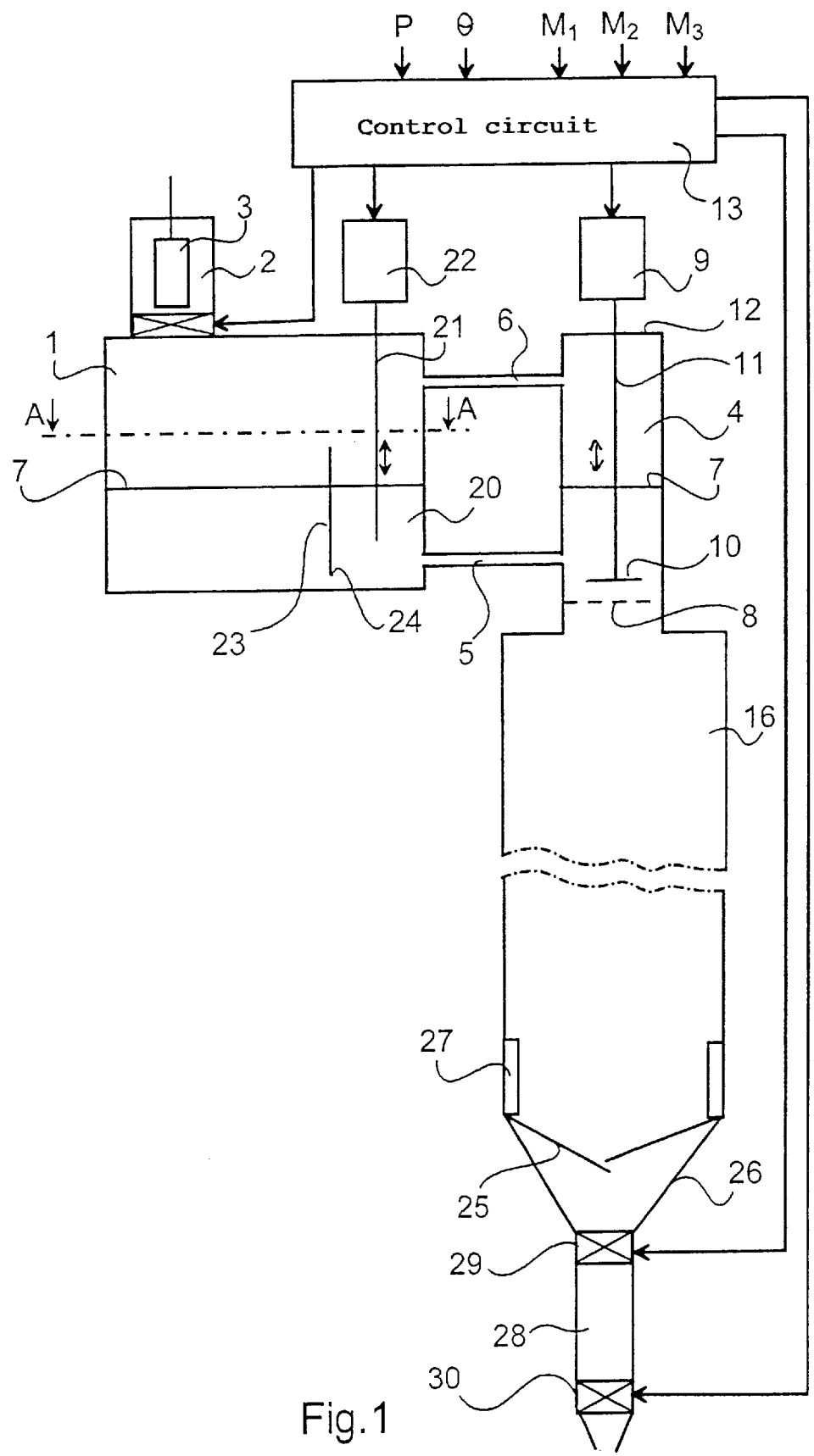
FIG. 1 is a sectional schematic representation of a particular embodiment of a device according to the invention.

The device according to FIG. 1 comprises a vessel or melting pot 1, heated by any appropriate means (not represented), wherein the material intended for the balls can be injected, in the form of solid alloy, by means of a supply lock 2. The material, injected in the form of billets, of ingots or of bars 3, is melted in the fusion vessel. A second vessel or granulation pot 4, also heated by any appropriate means (not represented), is connected, at its base, to the base of the melting pot 1 by at least one transfer tube 5. A linking tube 6 connects the upper sections of the pots 1 and 4, above the level 7 of the melted material, so that the pressure P of the gaseous atmosphere on top of the melted material is identical in both pots. Moreover, a level detector (not represented), is connected to feeding system of the ingots in order to maintain constant the level of the melted material in the pots 1 and 4.

The granulation pot 4 comprises conventionally, at its lower section, at least one orifice 8 of pre-set diameter, through which the melted alloy flows in the form of a jet. A vibrator 9, attached to the lid of the granulation pot 4, transmits vibrations to the orifices 8 by means of a vibrating pallet 10, which is animated with of a vertical back and forth movement. It is well known that the vibrating pallet 10 is connected to the vibrator 9, for example of electromagnetic type, by a metallic rod 11 which goes through the lid 12 of the granulation pot 4 through a tight passage. The frequency of the vibrations ranges between 200 Hz and 10,000 Hz, preferably between 200 Hz and 6,000 Hz.

Figure 2:
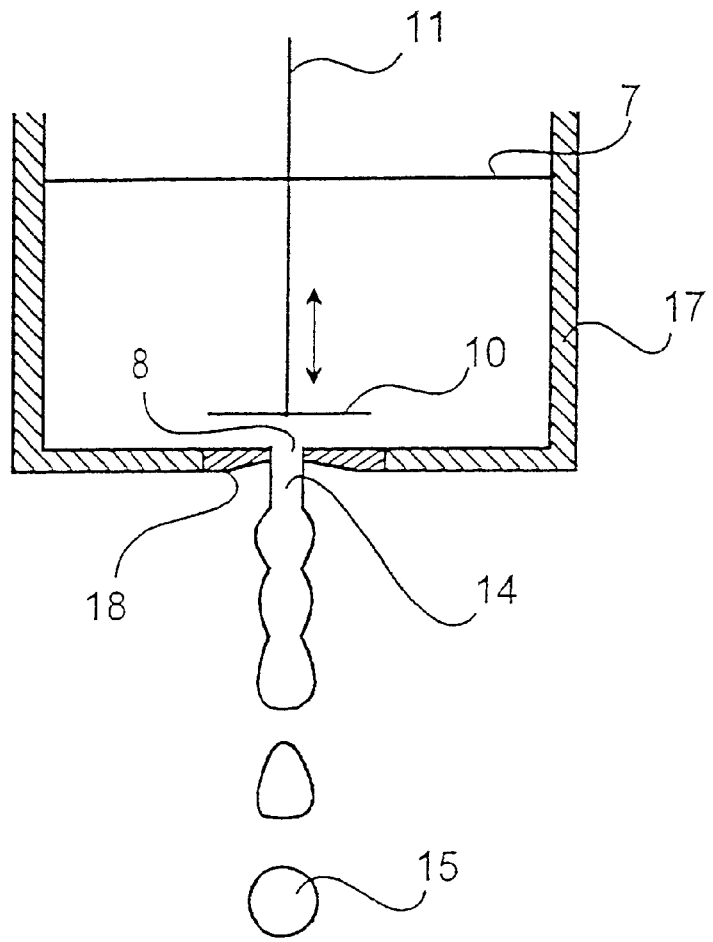
FIG. 2 represents in greater detail the lower section of the granulation pot of the device according to FIG. 1.

The material, for example a welding metallic alloy, is melted in the melting pot 1, then transferred in liquid form, by the transfer tube 5, in the granulation pot 4. The pressure P of the gaseous atmosphere (nitrogen for example) on top of the melted material is measured permanently and regulated by a control circuit 13, in order to impart a pre-set speed (preferably between 0.5 and 5 m/s according to the diameter of the orifice) at a jet of melted material going through each orifice 8 at the lower section of the granulation pot. The vibrations of the vibrating pallet 10 are transmitted to the laminar jet 14 from the orifice 8. As represented on FIG. 2, the jet 14 is then divided into droplets 15 whereof the diameter is determined mainly by the diameter D of the orifice 8 (preferably ranging between 80 and 800 µm). The droplets fall, by gravity, inside a cooling tower 16, filled with an inert gas wherein they solidify to form spherical balls. The use of helium, under a pressure ranging between 30 mbars and greater than 100 mbars, preferably in the order of 50 mbars, perfectly regulated at ±1 mbar, enables rapid cooling of the balls, within 2 to 3 s for example. The height of the cooling tower 16 is conventionally several meters, 7 m for example. Another inert gas may be used of course. However, the use of nitrogen or of argon would imply the use of a tower approximately twice as high.

Figure 3:
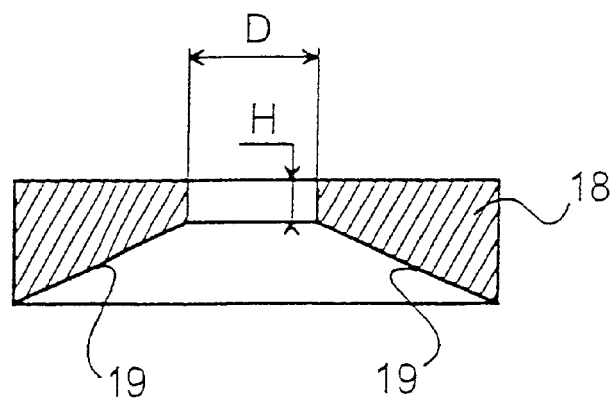
FIG. 3 illustrates in greater detail a particular embodiment of an outlet orifice of the granulation pot according to FIG. 2.

One or several orifices 8, circular, of diameter D, are preferably formed in a material which is not wettable by the melted material going through it and whereof the surface tension cancels the superficial tension of the material to be granulated. For exemplification purposes, the orifices 8 are made of sapphire or of ruby. In a particular embodiment illustrated on FIGS. 2 and 3, the wall 17 of the granulation pot 4 is made of stainless steel and comprises at its lower section an insert 18, of sapphire or of ruby, wherein is formed at least one orifice 8. Each orifice 8 is delineated by a vertical wall, of height H smaller than or equal to the diameter D. In a preferred embodiment, D=450 µm and H=190 µm. In the particular embodiment of FIGS. 2 and 3, the orifice 8 flares up in its lower section where it is delineated by tilted or curved walls 19 of the insert 18.

According to the invention, the melting pot 1 comprises an outlet chamber 20 wherein the melted material is subject to ultrasound stirring. This stirring can be realised by means of a bar 21 dipped in the melted material contained in the outlet chamber 20 and animated with a vertical back and forth movement by a vibrating device 22, for example of piezzo-electric type. This ultrasound stirring, for example at a frequency ranging between 20 kHz and 30 kHz, enables to improve substantially the surface condition of the balls. This stirring cannot be carried out in the granulation pot 4 since it might disturb the flow of the melted material through the orifices 8. This stirring causes essentially homogenisation of the melted material before being injected into the granulation pot 4. This stirring is performed only in the outlet chamber 20, i.e. in a section of the melting pot 1 situated in the vicinity of the outlet of the melted material towards the granulation pot 4 and wherein the whole material is already melted.

Figure 4:
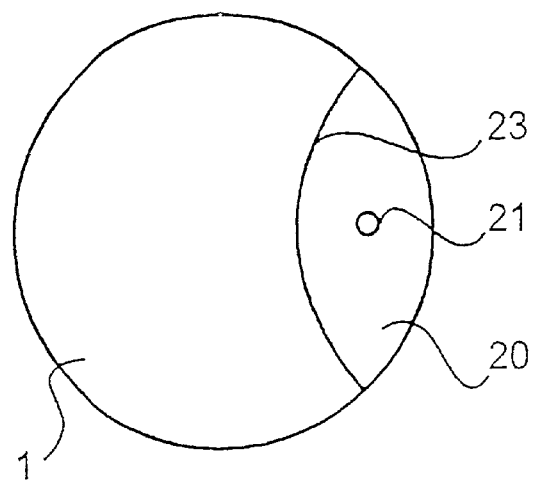
FIG. 4 is a sectional view, along A—A, of a melting pot according to FIG. 1.

In a preferred embodiment, illustrated on FIG. 4, the outlet chamber 20 has a volume smaller than approximately 20% of the volume of the melting pot 1. A wall 23, which can be curved, delineates the outlet chamber 20 inside the melting pot 1. The wall 23 is fitted with a passage 24 of a few millimetres (for example 5 mm) at its lower section to enable the melted material to enter the outlet chamber.

Homogenisation of the melted material before its injection in the granulation pot 4 causes, simultaneously, the dispersion of the crystallisation germs and the suspension in the material melted previously of micro-impurities, which might disturb the flow of the melted material through the orifices 8, let alone obstruct said orifices.

It can be noted that a device not containing this ultrasound stirring produces balls which may comprise, at their surface, craters of various sizes and depths, which make it unsuitable for using in electronics. Ultrasound stirring according to the invention enables to attenuate considerably this type of defects and generally even to make them disappear completely. Ultrasound stirring can be performed permanently. It may also be performed only intermittently by the control circuit 13. It should be noted that the melted material can be transferred continuously from the outlet chamber 20 towards the granulation pot 4, whereas the effect of homogenisation is reflected on the surface condition of the balls even if the melted material must remain in standby for a certain time, for exemplification purposes up to 30 mn, in the granulation pot 4 before going through the orifices 8.

Another measure, enabling to improve the surface condition of the balls obtained, consists in acting on the nature of the gas contained in the cooling tower 16. Indeed, said nature is extremely important for the sphericity of the balls, their quick solidification and their surface condition. According to another aspect of the invention, a pre-set quantity of oxygen, preferably a few ppm, for example in the order of 15 to 150 ppm is injected into the inert gas of the cooling tower 16. In the absence of oxygen in the inert gas of the cooling tower, the balls may exhibit at their surface micro-facets, which disappear if oxygen is injected into the inert gas. However, if the quantity of oxygen is too large, the balls do not always have the required sphericity.

The combination of ultrasound homogenisation, in the outlet chamber, of the melted material and of injecting a pre-set quantity of oxygen into the cooling tower enables to maximise the surface condition of spherical balls, notably of microballs formed out of a welding metallic alloy.

The reception of the balls at the lower end of the cooling tower 16 is, preferably, dampened to avoid any alteration of the surface condition of the balls. In numerous known devices, the balls are received in a liquid. This type of reception has the shortcoming of requiring drying of the balls at a later stage.

Figure 5:
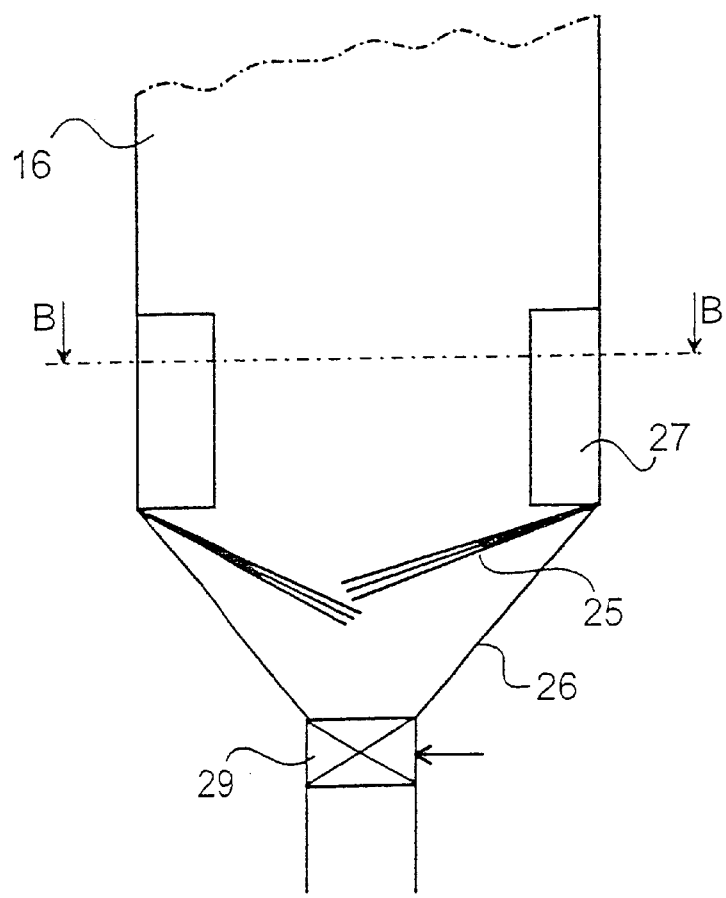
FIG. 5 represents a particular embodiment of a shock-absorbing device arranged at the lower section of the cooling tower of a device according to FIG. 1.
Figure 6:
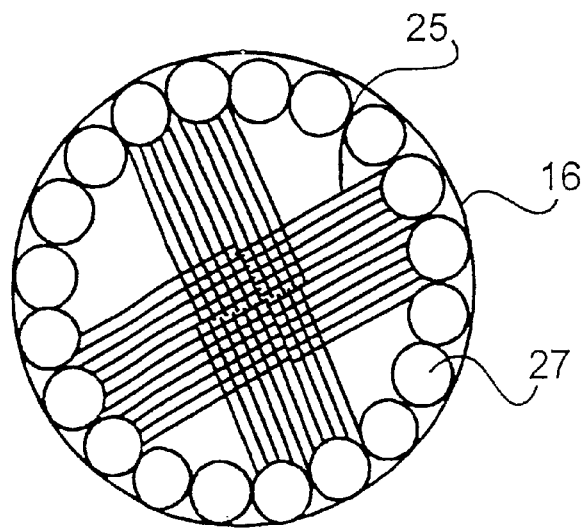
FIG. 6 is a sectional view, along B—B, of the shock-absorbing device of FIG. 5.

In the preferred embodiment represented on FIGS. 5 and 6, the shocks are essentially absorbed by brushes 25. This enables to eliminate any liquid in the reception zone, whereas all the phases of the process are then carried out in dry condition. Each brush 25 is composed of polyamide-based wires whereof one end is fixed in the vicinity of the junction of the lower vertical section of the inner wall of the cooling tower and of a reception cone 26. The wires form an angle of approximately 45° with the trajectory of the balls in the cooling tower, i.e. substantially an angle of 45° with the vertical. In a particular embodiment, four brushes 25 approximately 10 cm in width, opposite in pairs, are distributed along the periphery of the cooling tower, whereas the free ends of the wires of two opposite brushes are on top of one another. The diameter of the wires is smaller than the diameter of the balls. The flexibility of the brushes lets the balls through once the shocks have been absorbed, without altering their surface condition.

Shock absorption of the balls by the brushes 25 before reaching the reception cone 26 can be completed by the use of rollers 27, preferably made of a polyamide-based cloth, arranged on the lower periphery of the inner wall of the cooling tower, above the brushes. The rollers 27, which may be arranged vertically (FIGS. 5 and 6) cover the zone situated immediately above the brushes. Any shock of a ball against the inner wall of the cooling tower, which may possibly be caused by a ball bouncing against a brush 25, is thus also dampened.

The reception cone 26 of the cooling tower is extended by a lock 28 fitted with an inlet valve 29 and an outlet valve 30, both operated by the control circuit 13. The lock enables periodical withdrawal of the balls accumulated in the reception cone 26. Said balls are then transferred to a calibration system.

Figure 7:
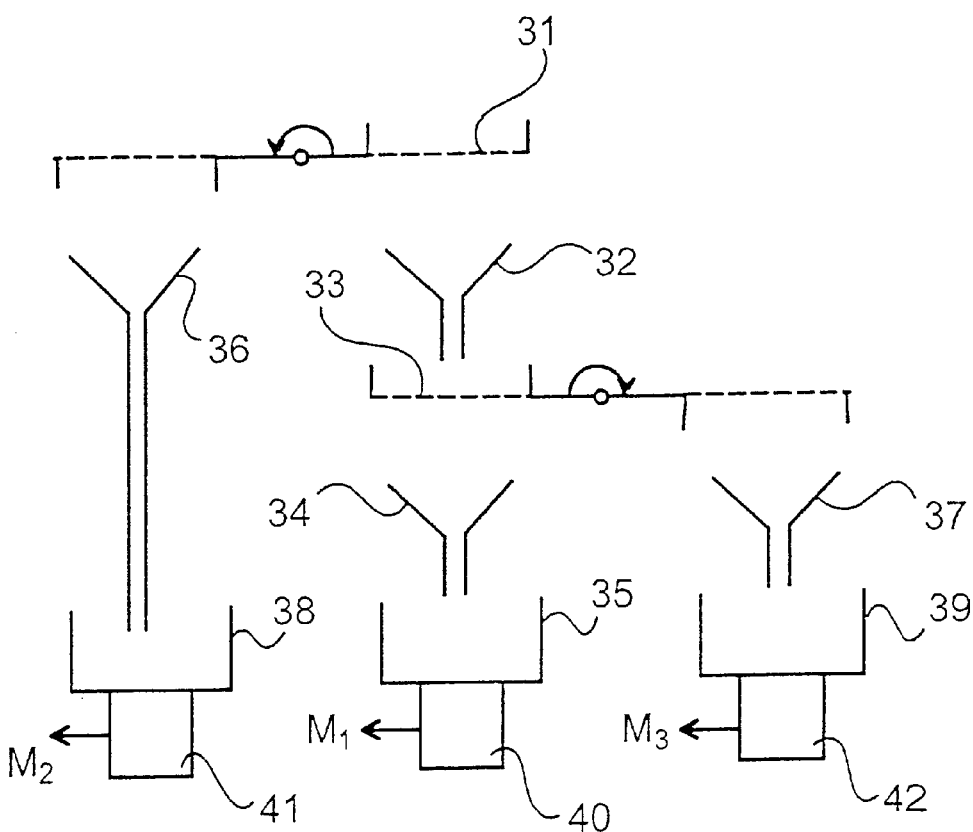
FIG. 7 represents, schematically, a particular embodiment of a calibration and weighing device arranged at the outlet of the cooling tower of a device according to FIG. 1.

In the particular embodiment of FIG. 7, the balls withdrawn (typically between 100 and 300 g/mn) fall by gravity on an upper sieve 31 which retains the balls whereof the sizes are greater than pre-set standards. The balls which have passed through the upper sieve 31 fall, through a first funnel 32, on a lower sieve 33, which lets too thin balls through. Said balls fall, through a second funnel 34, into a first tub 35. The balls corresponding to the standards are retained in the lower sieve 33. By turning the sieves 31 and 33 upside down, the balls which are too big and the balls which meet the standards, are caused to fall, respectively through the third and fourth funnels 36 and 37, respectively into the second and third tubs 38 and 39. The balls are thus sorted into three categories, in relation to their sizes: the complying balls into the third tub 39, the balls that are too thin into the first tub 35 and the balls that are too big into the second tub 38.

First, second and third scales 40, 41 and 42, placed respectively under the first, second and third tubs 35, 38 and 39, supply to the control circuit 13, for each extraction cycle, the signals $M_1$, $M_2$ and $M_3$, representative of the weight of the balls collected respectively into the first, second and third tubs. The control circuit 13 determines, on the basis of this weighing information, the percentage of balls withdrawn which comply with the standards and act on the granulation parameters to maintain an output close to 100%. In a preferred embodiment, the control circuit 13 regulates and adjusts notably the frequency of the vibrator 9. Indeed, the increased frequency of the vibrator 9 tends to reduce the sizes of the balls. For exemplification purposes, for a rated frequency of the vibrator of 500 Hz, the variation may amount to ±5 Hz.

The invention also concerns a device for producing spherical balls with a selection device of spherical balls enabling to sort the balls of uniform diameter, in order to put aside all the balls which are not perfectly spherical.

It has already been suggested to sort the spherical products of different diameters or exhibiting significant deformations by means of a tilted plane, whereas the balls are sorted in relation to the speeds reached by the different balls.

This type of sorting is suited to the sorting of balls all of them having already, before the sorting operation, the same diameter, with narrow tolerances, but whereof the sphericity varies, over a relatively narrow range. The purpose of the sorting operation is then to eliminate all the balls which are not perfectly spherical and whereof the surface condition is not perfect.

Figure 8:
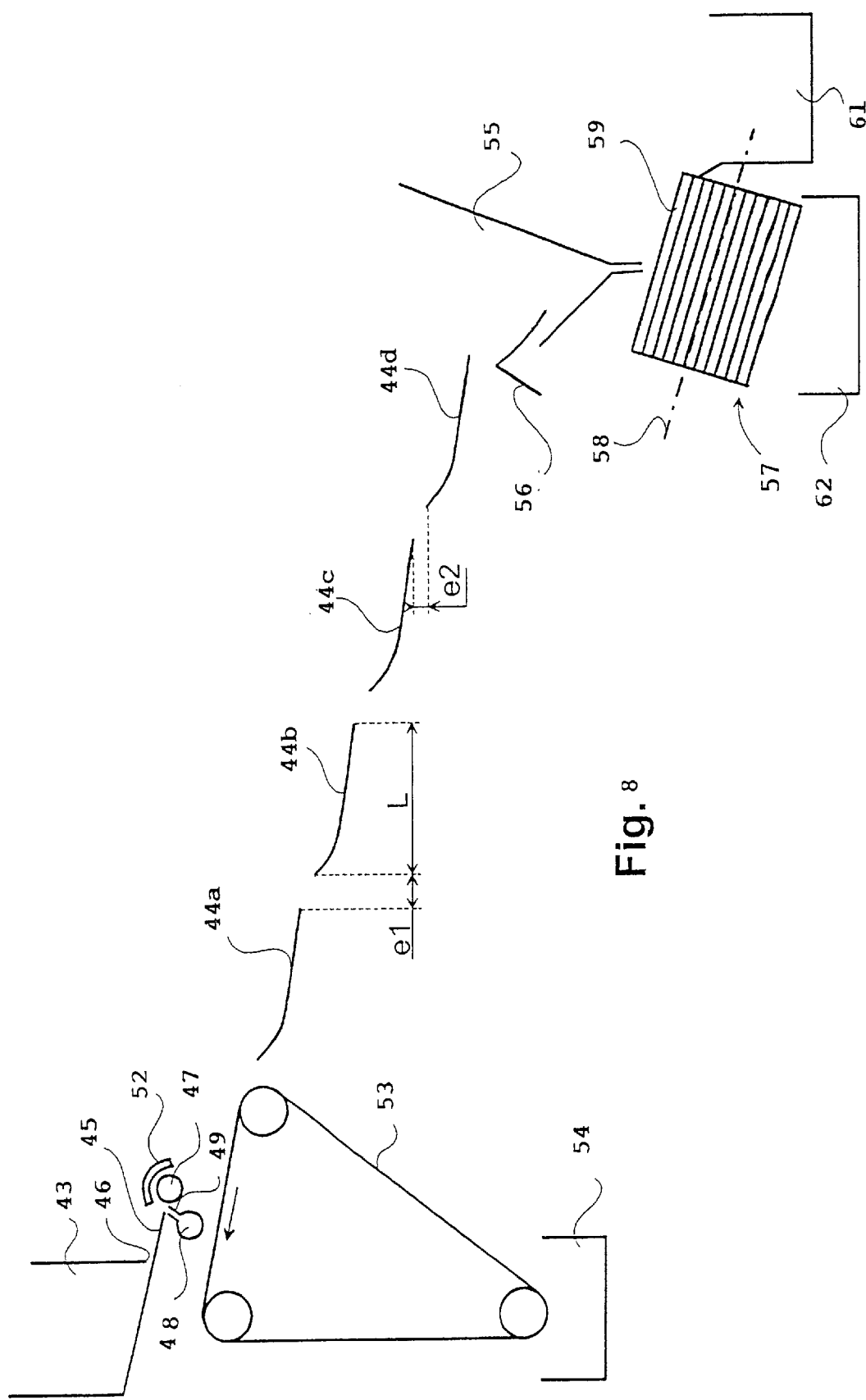
FIG. 8 represents, schematically, a particular embodiment of a selection device of a unit according to the invention.

In the embodiment represented on FIG. 8, the device comprises a tub, in the form of a hopper 43, wherein are placed the balls to be sorted. Such a tub is arranged at the outlet of the device for producing spherical balls described above. The balls are passed over a succession of tilted planes 44a, 44b, 44c and 44d. Each tilted plane is situated slightly beneath the previous tilted plane and a horizontal space e1 separates two successive tilted planes. The void spaces between the tilted planes enable to eliminate the balls which arrive at the end of a tilted plane without having reached sufficient speed to pass over the following tilted plane without falling between both successive tilted planes.

All the tilted planes have not the same surface condition and that plane is controlled perfectly for each diameter of the balls to be sorted. Indeed, the speed of the balls depends on the combined effects of several types of loads, notably of the gravity, of the friction loads, of the aerodynamic loads, of the interaction with the rolling surfaces, etc . . . The tilted planes are, preferably, composed of metal sheets whereof the surface has a controlled roughness, greater for at least one of the first tilted planes, in the direction of displacement of the balls. The roughness of the first tilted plane 44a is greater than that of the following tilted planes, in order to slow down more significantly the balls with surface defects. As the trajectory of such a ball on a surface exhibits, too, clearly cut defects is indeed more complex, which tends to slow down the ball, causing it to fall between the tilted planes 44a and 44b for example. The presence of a controlled roughness should not cause the friction to increase, which might cause a degradation of the surface condition of the balls, but unsettle their trajectories in relation to their unevenness. This enables the right spherical balls to follow more direct trajectories and to reach consequently higher outlet speeds To obtain the requested roughness, the surface of the tilted planes is treated by any appropriate means, for example by sanding, shot-peening or by any other mechanical and/or chemical means, or be covered by an appropriate coating, etc . . . In a preferred embodiment, both first tilted planes 44a and 44b exhibit high roughness, which can be smaller for the second. The latter tilted plane 44d, possibly both latter tilted planes 44c and 44d, may have a perfectly smooth surface. Interaction between the surface defects of the balls and the surface condition of the tilted planes thus enables quick elimination of the faulty balls.

The slope of each tilted plane and the spaces between two successive tilted planes are determined, in relation to the diameter of the balls, so that the balls with very good sphericity roll on the tilted planes with sufficient speed to pass from one tilted plane to the next. Each tilted plane comprises, at its upstream section, an upward curvature, intended to attenuate the shocks upon reception of the balls on the tilted plane and to prevent the balls from bouncing back.

For exemplification purposes, for selecting microballs of welding alloy, whereof the diameter is typically smaller than 500 μm, each tilted plane has, in horizontal projection, a length L, which can be in the order of 10 to 15 cm, and a width which can be in the order of 1 m. The vertical space e2 between two successive tilted planes can be smaller than or equal to 1 cm, whereas the horizontal space e1 can be in the order of 1 cm to 3 cm. The number of tilted planes is inversely proportional to the size of the balls, preferably ranging between 2 and 5. Besides, the heavier the balls, the faster they run. Consequently, the angle of the tilted planes must be small to enable good selection.

The balls coming from the hopper 43 are fed on the first tilted plane 44a by means of a rolling plane 45, slightly tilted, extending from the bottom of the hopper 43. The balls exit at the base of the hopper 43 through a narrow passage 46, under the effect of the forces of gravity, in order to form a single layer of balls rolling on the rolling plane. At the free end of the rolling plane 45, the balls rest against a stop 47.

Figure 9:
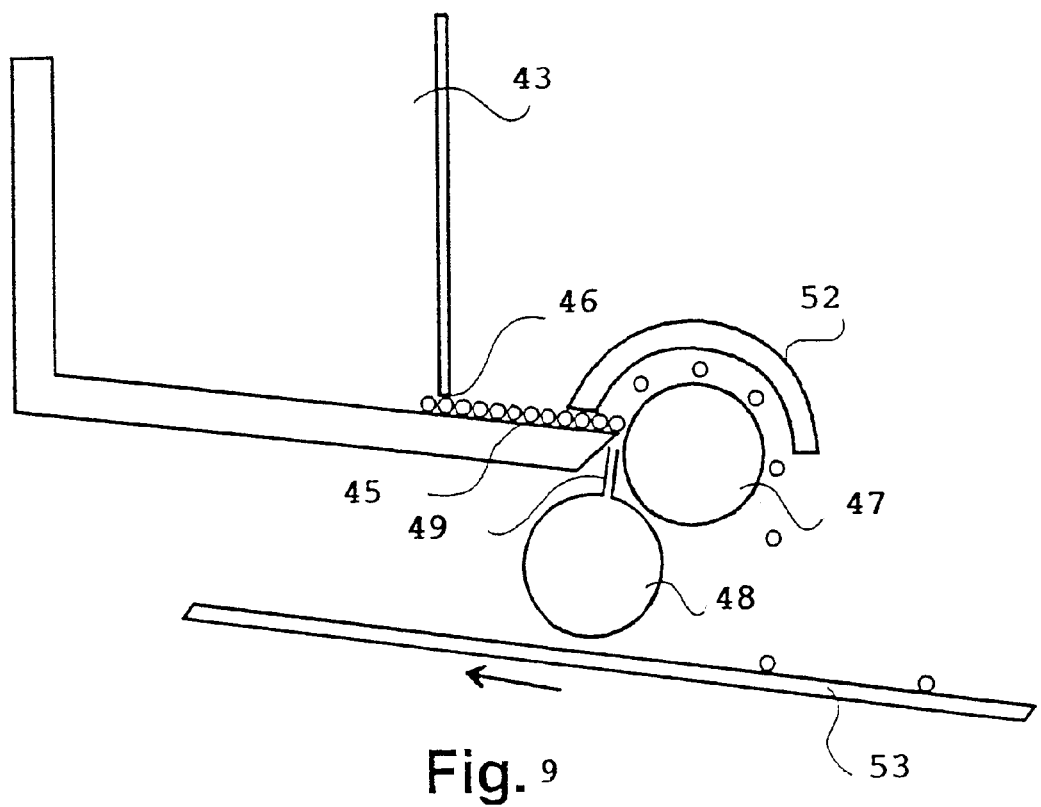
FIGS. 9 and 10 represent in greater detail, respectively a side view and a bottom view, a particular embodiment of the section of the device situated upstream of the tilted planes of the selection device according to FIG. 8.
Figure 10:
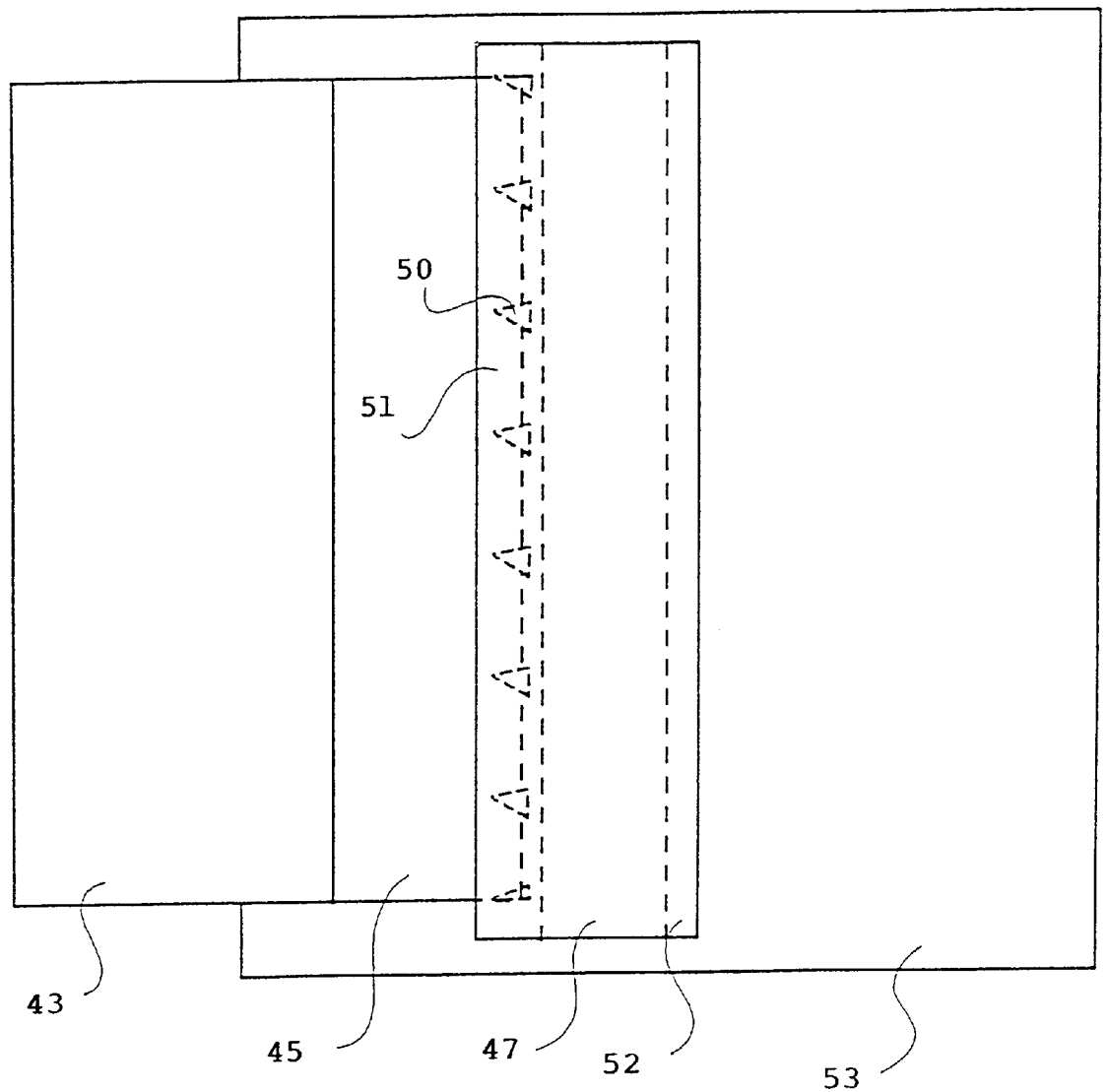

On FIGS. 8 to 10, the stop 47 is composed of a cylinder arranged at least over the whole width of the rolling plane 45, perpendicular to the direction of flow of the balls on the rolling plane 45. The balls align thus before the stop 47. A space, smaller than the diameter of a ball, separates the free end of the rolling plane 45 from the stop 47.

The balls aligned in front of the stop 47 are ejected jerkily from the rolling plane. The ejection is, preferably, realised by a ramp 48, composed of a hollow tube wherein circulates continuously a flux of compressed dry air or of inert gas (nitrogen, argon, etc . . . ). The ramp 48 is arranged parallel to the stop 47, above the free end of the rolling plane 45. It comprises a plurality of air nozzles 49, directed towards the space defined between the free end of the rolling plane and the stop, distributed uniformly along the ramp 48 and forming the ejectors provided for raising, preferably jerkily, the row of balls aligned in front of the stop 47.

Figure 11:
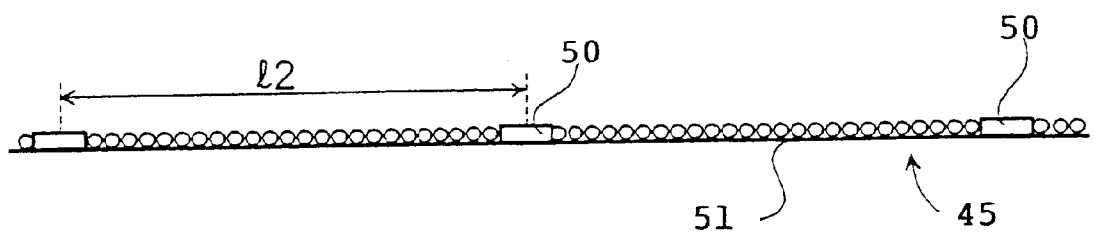
FIG. 11 represents a particular embodiment of the outlet rolling plane of the hopper of a device according to FIG. 10, seen from the free end of the rolling plane.
Figure 12:
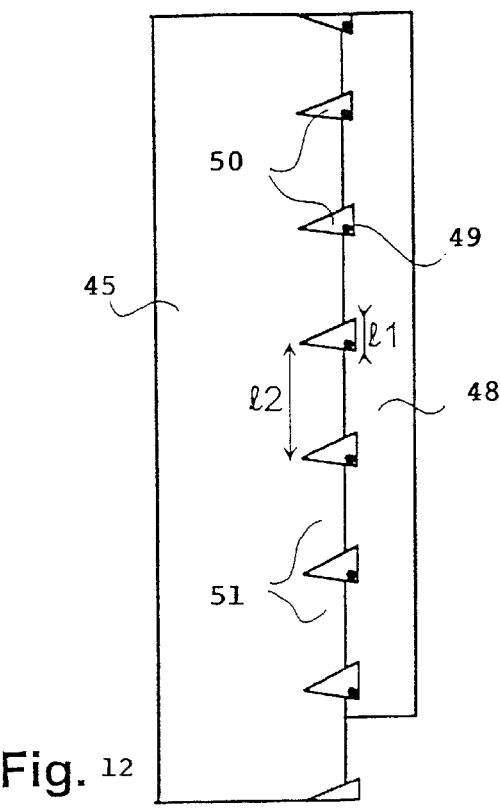
FIGS. 12 and 13 illustrate the respective positions of the mobile ramp and of the outlet rolling plane of the hopper for two extreme positions of the ramp.
Figure 13:
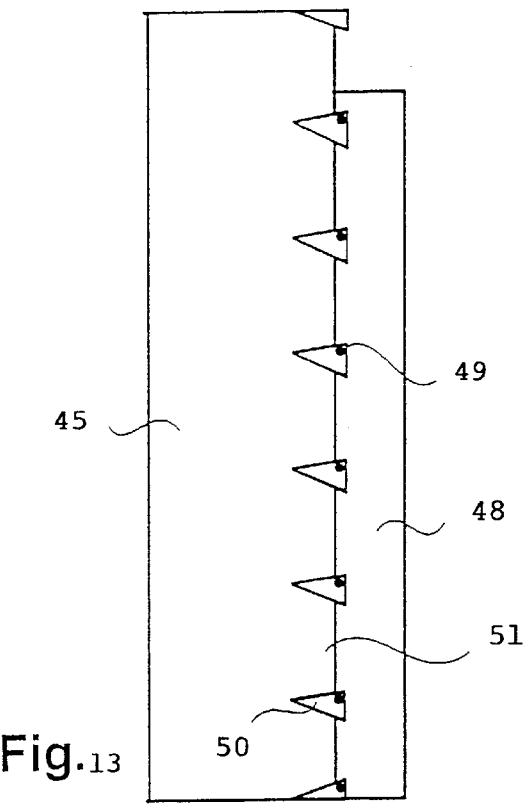

To ensure jerkily ejection of the balls, the ramp 48 is animated by a jack (not represented), with a lateral back and forth movement, perpendicular to the direction of flow of the balls (from left to right on FIGS. 10, 12 and 13) on the rolling plane 45. The respective positions of the ramp 48 and of the rolling plane 45 for two extreme positions of the ramp during its back and forth movement are represented on FIGS. 12 and 13. The rolling plane 45 comprises, at least at its free end, obstacles 50, of uniform thickness (FIG. 11), triangular seen from above, which divide said plane into a plurality of lanes 51 of decreasing width. The obstacles 50 are protruding very slightly at the free end of the rolling plane. The base of the triangular section of an obstacle 50, parallel to the free end of the rolling plane 45, has a length l1, and the apexes of two adjacent obstacles are separated by a distance l2 (FIG. 12). The base angles of the triangular obstacles 50 delineate the displacement of the air nozzles 49 in both extreme positions of the ramp 48 (FIGS. 12 and 13).

Thus, at the end of the travel, when the ramp 48 is in one of these extreme positions, all the air nozzles 49 are placed under the end of an obstacle 50. The air jets coming out of the ramp 48 through the air nozzles 49 are then channelled beneath the obstacles 50 and cannot eject the balls arranged in the lanes 51, on the rolling plane 45. Conversely, during the displacement of the ramp 48, the air jets coming out of the air nozzles associated with each lane cause the ejection of the row of balls resting against the stop 47. Ejection is gradual, paced with the displacement of the air nozzles. A dwelling time of the ramp at both ends enables to obtain intermittent ejection, jerkily, thereby clearing completely the space downstream, before ejection of a new row of balls and limiting the interactions between the balls liable to alter their surface condition. The quantity of balls present on each rolling zone is thus regulated and limited.

In a preferred embodiment 8, the obstacles delineate 7 lanes 51. The length l1 of the triangular base of the obstacles 50 can be in the order of 20 to 30 mm, for a distance l2 in the order of 130 mm. The duration of displacement of the ramp between both its extreme positions can, for example, range between 1 s and a few second (frequency ranging between 0.1 and 1 Hz).

The balls ejected are directed by a baffle 52 on a tilted face of a conveyor belt 53. The baffle 52, preferably curved in shape, delineates with the stop 47 a passage for the balls ejected, which then fall onto a tilted face of the conveyor belt 53, arranged beneath the assembly composed of the rolling plane 45, the stop 47, the ramp 48 and the baffle 52. The face of the conveyor belt whereon fall the balls ejected is tilted in the same direction as the tilted planes 44a to 44d. The rotational direction of the conveyor belt 53 is the reverse of the rolling direction of the balls on this face of the conveyor belt (FIG. 8).

The balls with good sphericity roll on the tilted face of the conveyor belt, towards the first tilted plane 44a. The displacement speed of the conveyor belt is chosen so that the spherical balls rolling on its tilted face in reverse direction of its displacement reach the first tilted plane. For exemplification purposes, the speed of the conveyor belt can be in the order of 0.5 to 5 m/mn, preferably 2 m/mn. The conveyor belt makes a first selection. Indeed, the balls with large surface defects or the double balls, which cannot roll or which roll too slowly on the tilted face of the conveyor belt, are evacuated towards the rear by the conveyor belt and fall into a first tub 54, whereas the balls with sphericity roll, in reverse direction, up to the first tilted plane.

At the outlet of the last tilted plane 44d, the balls selected fall into a hopper 55. A mobile strip 56 can be arranged between the last tilted plane 44d and the hopper 55, in order to make a last selection between the balls before reception in the hopper. On FIG. 8, the strip 56 comprises an upper edge linking two walls whereof the one directs the faster balls towards the hopper 56, whereas the other evacuates the slower balls, which fall upstream of the upper edge.

The selection device described above enables to select the spherical balls of uniform diameter in relation to their surface condition. Only the balls having a perfect surface condition reach the hopper 55. However, it may happen that stuck balls reach the hopper 55. In practice, from approximately one million balls, 2 or 3 pairs of stuck balls reach the hopper. It is the case notably when a pair 60 of stuck balls falls on the conveyor belt 53, then on different tilted planes, so that the rolling of the pair is not slowed down, for example when the longitudinal axis S of symmetry of the pair (FIG. 15) is perfectly perpendicular to the direction of displacement of the balls. Also to eliminate the stuck balls that may reach the hopper 55, the device is, preferably, added a toothed wheel 57 of significant diameter, for example in the order of 30 cm, arranged downstream of the tilted planes.

Figure 14:
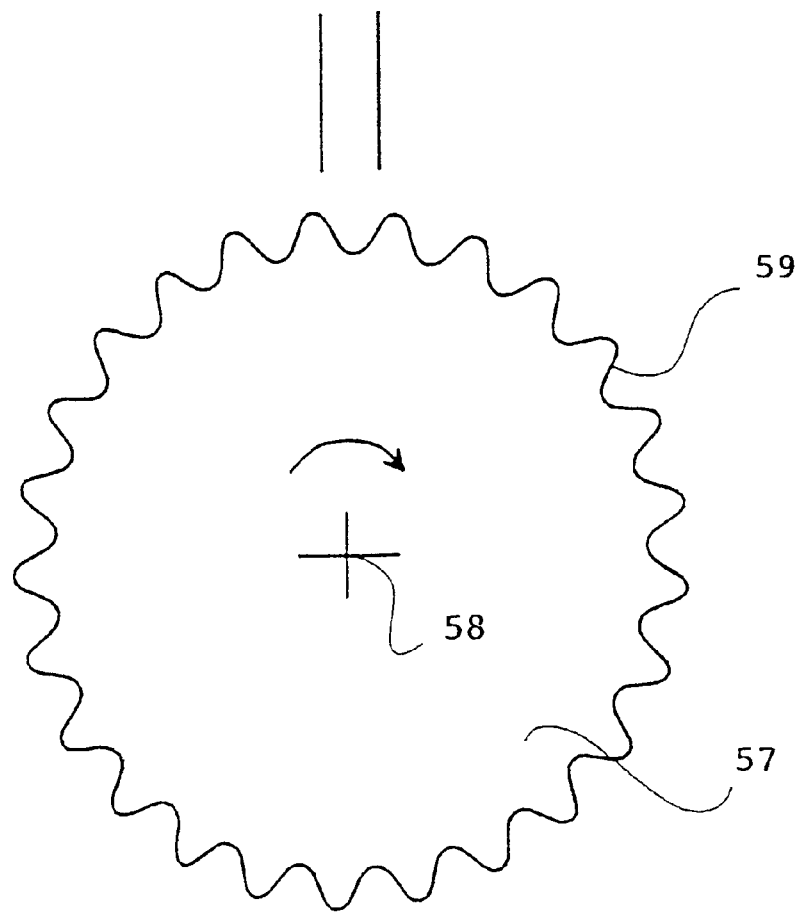
FIG. 14 represents, as a sectional view, the toothed wheel of the selection device according to FIG. 8.
Figure 15:
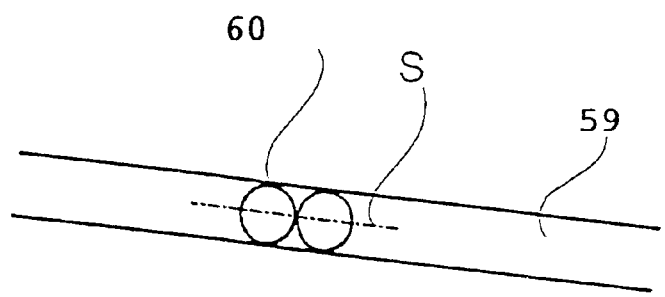
FIG. 15 illustrates the positioning of a pair of balls blocked inside a groove of the toothed wheel according to FIG. 14.

In the particular embodiment of FIG. 8, the hopper 55, in the form of a funnel, enables the balls to flow on the upper section of the toothed wheel 57. Said wheel is animated with a slow movement of rotation round a tilted axis 8 and comprises longitudinal grooves 59 whereof the dimensions enable an isolated ball to roll and prevent a pair 60 of stuck balls from rolling (FIGS. 14 and 15). The faultless balls roll into the grooves 59 of the toothed wheel and are collected in a second tub 61 arranged downstream of the toothed wheel. The pairs 60 of stuck balls blocked in the grooves rotate with the toothed wheel round the axis 58 and fall by gravity into a third tub 62 when the toothed wheel has rotated half a turn and the groove wherein the pair 60 is situated, has reached the lower section of the toothed wheel, above the third tub.

The toothed wheel 57 comprises, preferably, several hundreds of grooves. The bottom of the grooves 59 has approximately 1.2 to 1.5 times the diameter of the balls, so that a pair of stuck balls cannot be placed perpendicular to the groove and roll into said groove. To cause the balls to fall more readily into the grooves 59, the apexes of the teeth of the toothed wheel are, preferably, sharp with a slightly rounded tip.

A baffle (not represented) in the form of an arc of circle matching the outer diameter of the toothed wheel can be placed perpendicular to the grooves 59, in order to act as a barrier in case of a bottleneck at the outlet of the hopper 55.

The invention is not limited to the particular embodiments represented. In particular, the number and the layout of the orifices 8 can be different from those represented on the figures. Similarly the sorting and the weighing of the balls at the outlet of the cooling tower may be carried out by any other appropriate means capable of separating the balls complying with the standards from the other balls and of supplying the requested information. The number and the layout of the sieve, of the funnels and of the tubs can be different from what is represented. The control circuit 13 receives, preferably, signals that are representative of the various parameters liable of exerting an influence on the balls produced by the device and controls the various members that may influence said parameters. It receives thus, notably, via any appropriate means, on top of the signals $M_1$, $M_2$ and $M_3$, measuring signals of the pressure P and of the temperature $\Sigma$ in the pots 1 and 4 as well as in the cooling tower 16. It controls notably the infeed of material 3 from the supply lock 2, the extraction of the balls by the lock 28, the vibrating device 22, the vibrator 9, the heating of the pots 1 and 4, the gaseous pressure inside the pots and the cooling tower and the quantity of oxygen contained in the cooling tower.

The shape, the sizes, the layout and the number of the tilted planes of the selection device can be adapted to the sizes of the balls to be selected. The stop 47 need not be cylindrical. Curved shapes are nevertheless advantageous, since sharp edges may damage the surface condition of the balls.

What is claimed is:

1. A device for producing spherical balls comprising:
   means for feeding, in a fusion vessel, material intended to form the balls,
   a second vessel communicating with the fusion vessel in order to receive the melted material,
   means to form, out of the melted material contained in the second vessel, a jet through at least one orifice,
   vibrating means to transmit vibrations to the orifice, in order to transform the jet into droplets,
   a cooling tower, arranged at the outlet of the orifice and filled with an inert gas, wherein the droplets, falling by gravity, solidify to form the balls,
   and means for receiving balls at a lower end of the cooling tower, said device comprising an outlet chamber in the fusion vessel and means for ultrasound stirring of the melted material contained in the outlet chamber before its transfer to the second vessel, the inert gas contained in the cooling tower containing a pre-set quantity of oxygen.

2. A device according to claim 1, wherein the quantity of oxygen contained in the inert gas of the cooling tower is in the order of 15 to 150 ppm.

3. A device according to claim 1, wherein the volume of the outlet chamber is smaller than approximately 20% of the volume of the fusion vessel.

4. A device according to claim 1, wherein the fusion vessel comprises a wall delineating the outlet chamber, said wall being fitted with a passage at its lower section to enable the melted material to enter the outlet chamber.

5. A device according to claim 1, wherein the ultrasound stirring means comprise a bar immersed in the melted material of the outlet chamber and animated with a vertical back and forth movement.

6. A device according to claim 1, wherein the orifice is made of a material that cannot be wetted by the melted material.

7. A device according to claim 1, wherein the means for receiving balls comprise shock-absorbing means.

8. A device according to claim 7, wherein the shock-absorbing means comprise brushes composed of polyamide-based wires, forming an angle of approximately 45° with the trajectory of the balls in the cooling tower.

9. A device according to claim 8, wherein the shock-absorbing means comprise cloth rollers arranged on the lower periphery of the inner wall of the cooling tower, above the brushes.

10. A device according to claim 1, comprising, at the outlet of the cooling tower, means for periodical extraction of the balls and calibration means comprising means for sorting the balls into three categories, in relation to their sizes.

11. A device according to claim 10, comprising means for weighing all the balls of each category obtained at each withdrawal sequence, means for determining, on the basis of information supplied by the weighing means, a percentage of balls within pre-set standards and means for adjusting the frequency of the vibrating means in relation to said percentage.

12. A device according to claim 1, comprising a selection device comprising means for supplying the balls on a first tilted plane of a succession of tilted planes, separated by spaces of pre-set sizes, at least the first tilted plane, in the direction of displacement of the balls, having a surface whereof the roughness is greater than that of the following tilted planes.

13. A device according to claim 12, wherein at least the last tilted plane has a perfectly smooth surface.

14. A device according to claim 12, wherein the means for supplying the balls on the first tilted plane comprise a rolling plane, stop means, means of ejection to eject from the rolling plane, jerkily, the balls resting against the stop means.

15. A device according to claim 14, wherein the ejection means comprise a hollow ramp, animated with a lateral back and forth movement and fitted with a plurality of air ejectors distributed uniformly along the ramp.

16. A device according to claim 12, wherein the means for supplying the balls on the first tilted plane comprise a conveyor belt having a tilted face in the same direction as the tilted planes and a rotational direction opposite the rolling direction of the balls on said face.

17. A device according to claim 16, wherein the means for supplying the balls on the first tilted plane comprise deflector means to direct the balls ejected on the tilted face of the conveyor belt.

18. A device according to claim 12, comprising, downstream of the tilted planes, a toothed wheel animated with a rotational movement round a tilted axis and comprising longitudinal grooves whereof the sizes enable an isolated ball to roll and prevent a pair of stuck balls from rolling.

19. A device according to claim 18, comprising first reception means for the faultless balls rolling into the grooves of the toothed wheel, whereas the pairs of stuck balls blocked in the grooves fall by gravity into second reception means during the rotation of the toothed wheel.

* * * * *